US012584843B2

(12) United States Patent
Chatterjee

(10) Patent No.: US 12,584,843 B2
(45) Date of Patent: Mar. 24, 2026

(54) METHOD AND SYSTEM FOR TESTING THE INTEGRITY OF FILTERS

(71) Applicant: Sartorius Stedim Biotech GmbH, Göttingen (DE)

(72) Inventor: Kirit Chatterjee, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 334 days.

(21) Appl. No.: 18/259,258

(22) PCT Filed: Dec. 23, 2021

(86) PCT No.: PCT/EP2021/087500

§ 371 (c)(1),
(2) Date: Jun. 23, 2023

(87) PCT Pub. No.: WO2022/144301

PCT Pub. Date: Jul. 7, 2022

(65) Prior Publication Data

US 2024/0319064 A1     Sep. 26, 2024

(30) Foreign Application Priority Data

Dec. 28, 2020     (EP) ..................................... 20217390

(51) Int. Cl.
*G01N 15/08*     (2006.01)
*B01D 65/10*     (2006.01)

(52) U.S. Cl.
CPC ... *G01N 15/0826* (2013.01); *G01N 2015/084* (2013.01)

(58) Field of Classification Search
CPC .... G01N 15/00; G01N 15/08; G01N 15/0826; G01N 2015/084; B01D 65/10
See application file for complete search history.

(56) References Cited

U.S. PATENT DOCUMENTS

| 5,594,131 | A | * | 1/1997 | Lim ...................... C07F 7/1804 |
| | | | | 540/219 |
| 10,350,551 | B2 | * | 7/2019 | Armgart ........... G01N 15/0826 |
| 10,473,677 | B2 | * | 11/2019 | Stering ........... G01N 35/00623 |
| 2003/0234211 | A1 | | 12/2003 | Seiler et al. |

FOREIGN PATENT DOCUMENTS

| EP | 2425886 A1 | 3/2012 |
| WO | WO 2007/104797 A1 | 9/2007 |
| WO | WO 2016/030013 A1 | 3/2016 |
| WO | WO 2019/219502 A1 | 11/2019 |

OTHER PUBLICATIONS

International Search Report and Written Opinion for International Application No. PCT/EP2021/087500, mailed Mar. 29, 2022 (12 pages).

* cited by examiner

*Primary Examiner* — Nguyen Q. Ha
(74) *Attorney, Agent, or Firm* — Klarquist Sparkman, LLP

(57)     ABSTRACT

A method for testing integrity of a filter can include pressurizing an upstream side of the filter to a test pressure and performing a check step that includes determining a flow rate of fluid from the upstream side to a downstream side of the filter, comparing the determined flow rate with a flow range including a flow threshold, and setting stop criteria based on the comparison.

13 Claims, 11 Drawing Sheets

| Test Pressure Ranges [mbar] | Volume ranges [ml] | Stabilization Time [min] |
|---|---|---|
| 0 - 2800 | 0 - 300 | 3 |
| 0 - 2800 | 301 - 3000 | 5 |
| 0 - 2800 | 3001 - 8000 | 7 |
| 0 - 2800 | 8001 - 20000 | 10 |
| 0 - 2800 | 20001 - 50000 | 12 |
| 0 - 2800 | 50001 - 150000 | 15 |
| 2801 - 4000 | 0 - 300 | 5 |
| 2801 - 4000 | 301 - 3000 | 7 |
| 2801 - 4000 | 3001 - 8000 | 10 |
| 2801 - 4000 | 8001 - 20000 | 13 |
| 2801 - 4000 | 20001 - 50000 | 15 |
| 2801 - 4000 | 50001 - 150000 | 18 |
| 4001 - 6600 | 0 - 300 | 7 |
| 4001 - 6600 | 301 - 3000 | 10 |
| 4001 - 6600 | 3001 - 8000 | 13 |
| 4001 - 6600 | 8001 - 20000 | 15 |
| 4001 - 6600 | 20001 - 50000 | 18 |
| 4001 - 6600 | 50001 - 150000 | 20 |

Figure 4

| Volume Under Test [mL] | Required Pressure Drop [mbar] |
|---|---|
| 0 - 300 | 20 |
| 301 - 3000 | 30 |
| 3001 - 8000 | 40 |
| 8001 - 20000 | 50 |
| 20001 - 50000 | 60 |
| 50001 - 150000 | 70 - 100 |

Figure 9

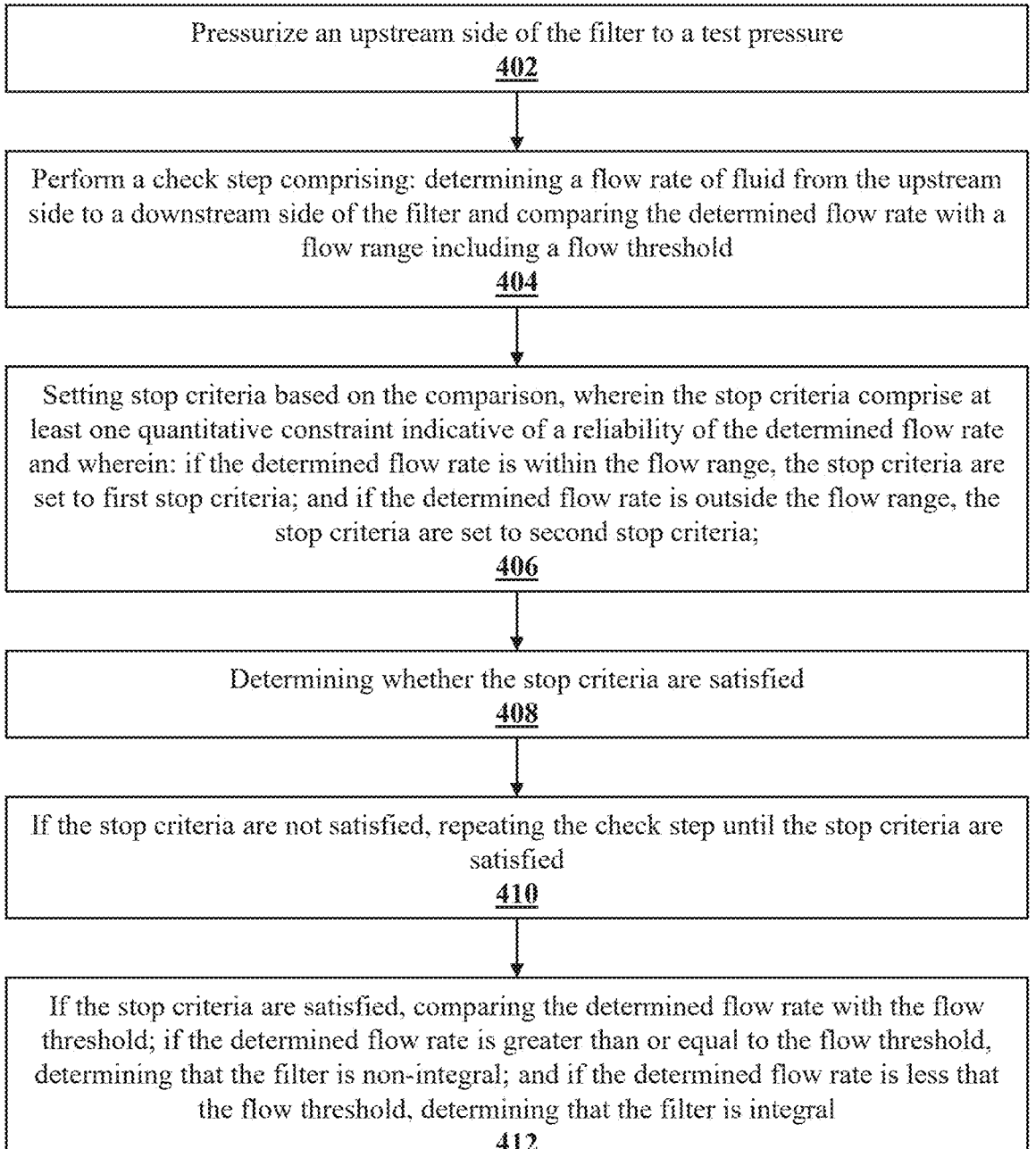

400

Pressurize an upstream side of the filter to a test pressure
402

Perform a check step comprising: determining a flow rate of fluid from the upstream side to a downstream side of the filter and comparing the determined flow rate with a flow range including a flow threshold
404

Setting stop criteria based on the comparison, wherein the stop criteria comprise at least one quantitative constraint indicative of a reliability of the determined flow rate and wherein: if the determined flow rate is within the flow range, the stop criteria are set to first stop criteria; and if the determined flow rate is outside the flow range, the stop criteria are set to second stop criteria;
406

Determining whether the stop criteria are satisfied
408

If the stop criteria are not satisfied, repeating the check step until the stop criteria are satisfied
410

If the stop criteria are satisfied, comparing the determined flow rate with the flow threshold; if the determined flow rate is greater than or equal to the flow threshold, determining that the filter is non-integral; and if the determined flow rate is less that the flow threshold, determining that the filter is integral
412

Figure 11

METHOD AND SYSTEM FOR TESTING THE INTEGRITY OF FILTERS

CROSS REFERENCE TO RELATED APPLICATIONS

This is the U.S. National Stage of International Application No. PCT/EP2021/087500, filed Dec. 23, 2021, which was published in English under PCT Article 21(2), which in turn claims the benefit of European Application No. 20 217 390.2, filed Dec. 28, 2020. The prior applications are incorporated herein by reference in their entirety.

TECHNICAL FIELD

The following description relates to a method, a medium and a system for testing the integrity of filters in the pharmaceutical industry and/or the biotechnology industry.

BACKGROUND

Filter integrity is a fundamental element of sterility assurance during production of pharmaceutical (e.g. biopharmaceutical) and/or biotechnological products. Different types of integrity tests can be performed, including destructive and non-destructive tests. Non-destructive tests are particularly advantageous because they can be performed prior to the use of the filter. Examples of non-destructive tests include the diffusion test, the bubble point test and the water flow test (also called water intrusion test).

The underlying general concept for a non-destructive integrity test is as follows. An integrity tester pressurizes an external volume at the upstream side of the filter to a set test pressure and maintains said pressure for a duration defined by a stabilization time. After this, a quantity indicative of the integrity of the filter is determined during a check phase lasting for a duration defined by a check duration. If the quantity being measured stays below a predefined limit, the integrity test is evaluated to be a passed test. Thus, the stabilization time and the check duration affect the dependability and the efficiency of the test. Alternatively, direct flow measurements can also be performed, in which case a stabilization phase may not be required.

SUMMARY

It is an object of the invention to improve the efficiency (in particular the time efficiency) of an integrity test while at the same time enhancing the dependability thereof.

The achievement of this object in accordance with the invention is set out in the independent claims. Further developments of the invention are the subject matter of the dependent claims.

According to one aspect, a method for testing integrity of a filter is provided. Said otherwise, a method for performing an integrity test of a filter is provided.

The filter may be any filter that is used in an industrial process in the biotechnological and/or biopharmaceutical field. For instance, the filter may be any one of the following: a depth filter, a pre-filter, a sterilizing grade filter, a mycoplasma retentive filter, a cross-flow (or tangential flow) filter, an ultrafiltration filter, a membrane adsorption filter, a virus retentive filter. The filter may be hydrophilic or hydrophobic. The filter may also be referred to as "filter assembly".

Exemplarily, the filter may be a sterile membrane filter comprising a housing and a membrane inside the housing, the membrane having a given pore size, which may e.g. range from about 10 nm to about 5 μm. The membrane can be made for example of polyethersulfon, polyvinylidene fluoride, polytetrafluoroethylene, cellulose acetate, regenerated cellulose and nylon. The housing can be made for example from polypropylene, polyamide or polytetrafluoroethylene.

The integrity test may be used to check for cracks and other defects in the filter that would compromise its functionality. The integrity of the filter may be tested applying the principles of established non-destructive techniques, such as the diffusion test (including a multipoint diffusion test) or the water flow test. These tests rely on the correlation between a physical quantity that can be easily determined from measurements and the actual retention capability of the filter. In the diffusion test, the physical quantity is the diffusion of a gas through a wetted filter, while in the water flow test the physical quantity is the flow of water through a hydrophobic filter.

The method comprises pressurizing an upstream side of the filter to a test pressure. In other words, the method comprises increasing the pressure at the upstream side of the filter until the pressure has reached a predetermined or predeterminable value, i.e. the test pressure.

A filter has an upstream side, which is the feed side of the filter, i.e. the surface of the filter through which the feed passes in order to be filtered, and a downstream side, which is the filtrate side of the filter, i.e. the surface of the filter from which the filtrate comes out after part of the feed is retained by the filter. For example, if the filter comprises a cylindrical membrane, the upstream side may be the outer surface of the cylinder and the downstream side may be the inner surface of the cylinder.

The pressure at the upstream side of the filter corresponds to the pressure that can be measured in an enclosed volume that is delimited, among others, by the upstream side of the filter, which is referred to as upstream volume. The specifics of this volume depend on the type of filter and on the configuration of the integrity tester. Exemplarily, for a filter comprising a housing, the upstream volume may be given by the net volume of the housing, the volume of connecting tubes and of the elements connected to the housing (such as the integrity tester).

The upstream volume is pressurized by introducing gas into the volume, e.g. by means of a gas inlet line connecting the integrity tester and the filter. The gas may be e.g. compressed air, carbon dioxide, nitrogen. The test pressure is the pressure that has to be reached for performing the integrity test. Indeed, there needs to be a pressure difference between the upstream side of the filter and the downstream side of the filter in order for a fluid to go through the filter to "test" it. A test fluid may be a liquid or a gas (pure gas or gas mixture). The test pressure $p_1$ may be in the range between about 25 mbarg and about 10 barg. The test pressure is a gauge pressure measured in relation to ambient atmospheric pressure.

The pressurization is one of the phases of the integrity test. The following phase is the check phase, optionally preceded by a stabilization phase. The check phase is the actual integrity checking part of the test, in which it is determined whether the filter is integral or not.

Indeed, the method further comprises performing a check step. The check step comprises determining a rate of the test fluid from the upstream side to a downstream side of the filter. The flow rate of the test fluid is the amount (or volume) of fluid that passes through the filter in a unit of time. The fluid may be a gas and the flow rate may be a diffusional flow rate. This is e.g. the case when the integrity test is a diffusion test, which can be performed on hydrophilic filters. Alternatively, the test fluid may be a liquid, e.g. water, and the flow rate may be a bulk (or volumetric) flow rate. This is e.g. the case when the integrity test is a water flow test (or water intrusion test), which can be performed on hydrophobic filters.

Depending on the specific integrity test, the filter may have to be prepared before the test begins. For instance, a hydrophilic filter may be wetted with wetting liquid, such as water or a mixture of water and alcohol, while a hydrophobic filter may be wetted with isopropyl alcohol.

Determining the flow rate may comprise, depending on the methodology employed to do so, measuring one or more physical quantities and/or performing calculations. For example, determining the flow rate may comprise measuring a pressure drop.

During the check phase, the pressure at the upstream side of the filter drops as the fluid diffuses through the filter. If $p_2(t_i)$ is the measured instantaneous pressure at a given time point $t_i$ which is separated by a time interval $\delta_t$ from the start of the check phase, which may substantially coincide with the end of the pressurization phase, or optionally the end of a stabilization phase as discussed below, a pressure drop can be defined as $\Delta p = p_1 - p_2$, where $p_1$ is the pressure at the start of the check phase.

In the context of a diffusion test, the flow rate $F(t_i) = D(t_i)$ at the time point $t_i$ may exemplarily be determined as follows:

$$D(t_i) = \frac{p_1 \cdot V_1 \cdot 60}{p_0 \cdot \delta t} \cdot \ln\left[\frac{p_1}{p_1 - \Delta p}\right][\text{ml/min}]$$

D=diffusional flow rate in mi/mi
$p_1$=test pressure in mbar at the start of the check phase
$\Delta p = p_1 - p_2$ pressure drop in mbar
$V_1$=upstream volume in ml
$\delta t$=elapsed time in seconds
$p_0$=1000 mbar (or measured barometric pressure).

The upstream volume may be given a priori (e.g. retrieved from a storage medium or input by a user) or, in a particular example, the method may further comprise measuring the upstream volume, i.e. the volume at the upstream side of the filter. The determination of the upstream volume can be carried out according to conventional techniques, e.g. using Boyle's law, or may be input by a user.

In the context of a water flow test, the flow rate $F(t_i) = B(t_i)$ at the time point $t_i$ may exemplarily be determined as follows:

$$B(t_i) = \frac{\Delta p \cdot V_1 \cdot 60}{p_1 \cdot \delta t}$$

B=bulk/volumetric flow rate in ml/min
$p_1$=test pressure in mbar
$\Delta p = p_1 - p_2$ pressure drop in mbar
$V_1$=upstream volume in ml
$\delta t$=elapsed time in seconds.

Other ways of determining the flow rate may be used.

The check step further comprises comparing the determined flow rate with a flow range including a flow threshold. The flow range is a range of values defined by a lower limit $F_1$ and an upper limit $F_2$ or, said otherwise, is the set of values containing all values between the lower limit and the upper limit. The flow range may be an open interval or a closed interval. The flow threshold $F_h$ is a threshold value and belongs to the flow range, i.e. $F_1 < F_{th} < F_2$, or $F_1 = F_{th} - C_1$ and $F_2 = F_{th} + C_2$ with $C_1$, $C_2$ constants. In some examples, the flow threshold may be the midpoint of the flow range, i.e. $C_1 = C_2$.

The flow threshold is an upper limit for the flow rate: a filter exhibiting flow rates higher than this upper limit may be declared as non-integral. The value of the flow threshold may depend on a plurality of factors including, but not limited to, the type of integrity test, the area of the filter, the thickness of the filter, the test pressure. For example, for a diffusion test the flow threshold may range from about 1-3 ml/mi to about 200-300 ml/min, depending on the characteristics of the filter. Exemplarily, the value of the flow threshold may be assessed by performing a bacterial challenge test and it may be provided in the technical specifications of a filter.

The lower limit and the upper limit are determined accordingly to create an interval containing the flow threshold and their specific values may be set based on at least some of the factors listed above. Exemplarily $F_1$ may be at least 85% of $F_{th}$, further exemplarily at least 90% of $F_{th}$, yet further exemplarily 92% of $F_{th}$. Exemplarily $F_2$ may be at most 115% of $F_{th}$, further exemplarily at most 110% of $F_{th}$, yet further exemplarily 108% of $F_{th}$.

The flow range may exemplarily be stored in a storage medium, so that comparing the determined flow rate with the flow range may comprise retrieving the flow range from the storage medium.

The check step further comprises setting stop criteria based on the comparison and determining whether the stop criteria are satisfied. If the stop criteria are not satisfied, the method comprises repeating the check step until the stop criteria are satisfied.

The stop criteria are conditions that allow to determine whether the determined flow rate is sufficiently reliable, i.e. whether it provides a sufficiently accurate estimate of the actual flow rate. Indeed, as for all physical quantities, the true value (the actual flow rate) cannot be known but only estimated. In particular, since the flow rate is derived from measured quantities, the determined flow rate is affected by errors inherent to the measuring process, such as uncertainties and/or artefacts.

Accordingly, the determined flow rate at a given time point may not accurately reflect the actual flow rate. However, the actual flow rate is related to the retention capability of the filter, which is the object of the integrity test. Therefore, in order to correctly assess the integrity of the filter, it should be ensured that the determined flow rate is reliable enough.

Thus, the check step (particularly the determination of the flow rate) is repeated over time until it is established that the determined flow rate is sufficiently accurate, namely that the stop criteria are satisfied. Hence, the check phase may comprise one or more iterations of the check step and, further, it comprises determining whether the filter is integral.

Each repetition of the check step may occur after a predetermined or predeterminable time interval from the previous execution of the check step, so that the first check step is performed at time $t_1$, the second check step at time $t_2 = t_1 + \Delta t_1$, the third check step at time $t_3 = t_1 + \Delta t_1 + \Delta t_2$ and so on. Exemplarily, the time intervals between the iterations may have varying duration, e.g. have decreasing duration as time passes ($\Delta t_1 > \Delta t_2$), or they may be constant ($\Delta t_1 = \Delta t_2$).

The durations of the time intervals may be fixed constants or may depend on one or more conditions being satisfied.

Once it is determined that the stop criteria are satisfied, the reiteration of determining the flow rate can be stopped. The period of time between the start of the check phase and the last iteration of the check step, i.e. the duration of the check phase, may be denoted as check duration. The end time point of the check phase may be denoted as check end time.

Hence, the repetition of the check step leads to a time series, i.e. a series of data points corresponding to different times, wherein each data point is a determined flow rate $F(t_i)$, with $i \in [1,n]$ and $t_n$ being the check end time. Each determined flow rate corresponds to a different time point and a different iteration of the check step.

Conventionally, the check duration is a predetermined, fixed quantity that is set to be long enough to ensure a reliable determined flow rate. According to the invention, the check duration is not a fixed quantity and depends instead on when the stop criteria are met. In other words, the check duration is a variable contingent on the actual reliability of the determined flow rate as prescribed by the stop criteria.

This leads to more time-efficient and more accurate integrity testing as compared to a fixed check duration. Indeed, if the determined flow rate is reliable at a time before the fixed check end time, the variable check duration will be shorter than the fixed check duration. If the determined flow rate becomes reliable at a time after the fixed check end time, the result of the test will be more accurate with the variable check duration.

Optionally, the stop criteria may be supplemented by a maximum check duration, which is a value that may be pre-programmed or may be set by a user. If the duration of the check phase reaches the maximum check duration, the repetition of the check step may be stopped even if the stop criteria have not yet been met. In this case, the last determined flow rate may be compared with the flow threshold, as discussed below.

Furthermore, based on the comparison between the determined flow rate and the flow range, the stop criteria are differently set. Specifically, if the determined flow rate is within the flow range, the stop criteria are set to first stop criteria; and if the determined flow rate is outside the flow range, the stop criteria are set to second stop criteria.

The second stop criteria are different from the first stop criteria. In particular, the second stop criteria are less stringent than the first stop criteria. This means that a determined flow rate that satisfies the second stop criteria does not necessarily satisfy the first stop criteria, while a determined flow rate that satisfies the first stop criteria always satisfies the second stop criteria.

Accordingly, the determined flow rate at a given time point may satisfy only the second stop criteria but not the first stop criteria. Thus, the check duration is different depending on how the stop criteria have been set, specifically it may be shorter if the stop criteria are the second stop criteria, thereby making the test faster but not less accurate.

The choice of the stop criteria and, consequently, of the check duration is based on the comparison of the determined flow rate with the flow range. In other words, the value of the determined flow rate is checked against the flow range to verify whether the determined flow rate $F(t_i)$ lies within the flow range or outside the flow range, i.e. whether $F(t_i) \in [F_1, F_2]$ or not.

Since the flow range is an interval around the flow threshold, if the determined flow rate lies within the flow range, it is closer to the flow threshold, while if it lies outside the flow range, it is farther away from the flow threshold. As will be discussed below, in order to assess the integrity of the filter, it is checked whether the determined flow rate exceeds the flow threshold or not.

Since the relation of the determined flow rate to the flow threshold is decisive, when the determined flow rate is near the flow threshold the accuracy of the determined flow rate is of particular importance. Indeed, even a relatively smaller inaccuracy in the determined flow rate may lead, in this case, to a wrong assessment about the filter integrity. Conversely, if the determined flow rate is sufficiently distant from the flow threshold (i.e. outside the flow range), even a relatively larger inaccuracy would not change the result of the assessment.

Accordingly, the stop criteria are stricter when the determined flow rate is within the flow range and less stringent when the determined flow rate is outside the flow range. The check duration is, thus, adaptively determined: it is longer when a more careful scrutiny is required and it is shorter when the determined flow rate is already sufficiently robust for the comparison with the flow threshold. Therefore the method enhances the time efficiency of an integrity test while maintaining its accuracy, in other words without comprising its quality.

In a particular example, the flow range may be a first flow range and the stop criteria may be set to the second stop criteria if, further to the determined flow range being outside the first flow range, the determined flow range is within a second flow range, the first flow range being included in the second flow range; and the method may further comprise setting the stop criteria to third stop criteria if the determined flow rate is outside the second flow range.

More generally, there may be more than two different stop criteria, wherein the stop criteria are defined to be progressively less stringent as the determined flow rate gets farther and farther away from the flow threshold. In this case, a plurality of flow ranges may be defined, wherein the number of different stop criteria corresponds to the number of flow ranges plus one.

Each flow range may be around (e.g. centered on) the flow threshold: a first flow range $[F_1,F_2]$ may be the smallest range around $F_{th}$, a second flow range $[F_1^2, F_2^2]$ may include the first flow range $[F_1^2,F_2^2] \supset [F_1,F_2]$, a third flow range may include the second flow range $[F_1^3,F_2^3] \supset [F_1^2,F_2^2]$ and so on. Accordingly, $F_{th} \in [F_1,F_2] \subset [F_1^2,F_2^2] \subset [F_1^3, F_2^3] \subset \ldots \subset [F_1^n,F_2^n]$ for n flow ranges.

Therefore, the stop criteria may be set as follows:

if the determined flow rate is within the first flow range $F(t_i) \in [F_1, F_2]$, the stop criteria are set to first stop criteria;

if the determined flow rate is outside the first flow range and within the second flow range $F(t_i) \notin [F_1,F_2] \wedge F(t_i) \in [F_1^2,F_2^2]$ (or, equivalently, if $F(t_i) \in [F_1^2,F_2^2] \backslash [F_1,F_2]$) the stop criteria are set to second stop criteria;

[ . . . ]

if the determined flow rate is outside the (n−1)-th flow range and within the n-th flow range $F(t_i) \notin [F_1^{n-1}, F_2^{n-1}] \wedge F(t_i) \in [F_1^n, F_2^n]$, the stop criteria are set to n-th stop criteria; and if the determined flow rate is outside the n-th flow range, $F(t_i) \notin [F_1^n, F_2^n]$, setting the stop criteria to (n+1)-th stop criteria.

In this case, the first stop criteria are the most stringent and the (n+1)-th stop criteria are the least stringent.

The stop criteria comprise at least one quantitative constraint indicative of a reliability of the determined flow rate. The one or more quantitative constraints may constrain any one of or any combination of: the determined flow rate itself, quantities derived from it, other quantities related to the filter and/or the testing environment. The one or more constrained quantities are related to the reliability of the determined flow rate. Exemplarily, the constrained quantity(ies) may be correlated to a measurement error of the determined flow rate.

The constraints may exemplarily be in the form of numerical ranges, e.g. X must be in $[X_1,X_2]$ or X must be greater than $X_1$ or less than $X_2$. Alternatively or additionally, the constraints may be in the form of distributions, e.g. the values $Y_1$, $Y_2$, $Y_3$ must follow a normal distribution.

The first stop criteria and the second stop criteria may exemplarily be stored in a storage medium, so that setting the stop criteria may comprise retrieving the first stop criteria and second stop criteria from the storage medium. Alternatively or additionally, the stop criteria may be dynamically determined during the check phase, e.g. based on user input.

Determining whether the stop criteria are satisfied implies verifying whether the one or more constraints are met. Accordingly, it may comprise first measuring and/or computing the one or more constrained quantities. If there is a plurality of constraints, the stop criteria are satisfied only when all constraints are met.

As mentioned above, if the stop criteria are not satisfied, the check step is repeated until they are. If the stop criteria are satisfied, the method comprises comparing the determined flow rate $F(t_n)$ with the flow threshold. If the determined flow rate is greater than or equal to the flow threshold, it is determined that the filter is non-integral and if the determined flow rate is less than the flow threshold, it is determined that the filter is integral.

In other words, the flow rate determined as last during the check phase, which is the one deemed to be reliable, is checked against the flow threshold. If the determined flow rate is greater than or equal to the flow threshold, it means that more fluid is passing through the filter per unit time than what would pass if the filter were integral. Indeed, if there is e.g. a crack in the filter, more fluid would pass through it.

Further to the determination of whether the filter is integral, i.e. the result of the integrity test, the method may exemplarily further comprise providing this result to a user, e.g. displaying the result.

The flow threshold may exemplarily be stored in a storage medium, so that comparing the determined flow rate with the flow threshold may comprise retrieving the flow threshold from the storage medium. Additionally or alternatively, the value of the flow threshold may be provided by a user.

According to the method described above, an integrity test of a filter is performed in a manner that provides always reliable results concerning the integrity of the filter and, when possible, makes the test faster.

In a particular example, the stop criteria may comprise a stability range and a pressure drop threshold. The stability range is a numerical range and the pressure drop threshold is a numerical value. The stop criteria may comprise a constraint stating that a stability indicator must be within the stability range and a constraint stating that the pressure drop must be greater than or equal to the pressure drop threshold.

As mentioned above, the measured pressure drop is the difference between the pressure at the beginning of the check phase and the instantaneous pressure measured at the upstream side of the filter. The measured pressure drop is correlated with the error (or uncertainty) of the determined flow rate, specifically the higher is the pressure drop, the lower is the error. Accordingly, the pressure drop is a physical quantity that is meaningful to ascertain the reliability of the determined flow rate.

In particular, the determined flow rate may be considered accurate enough if the pressure drop is greater than or equal to the pressure drop threshold. The value of the pressure drop threshold may be determined heuristically and may be e.g. between about 10 mbar and about 100 mbar, depending on the volume. Exemplarily, for a volume between about 3 L and about 8 L and for stop criteria set to first stop criteria, the pressure drop threshold may be between about 10 mbar and about 20 mbar, e.g. about 15 mbar, and for stop criteria set to second stop criteria, the pressure drop threshold may between about 30 mbar and about 50 mbar, e.g. about 40 mbar.

The pressure drop increases with the passing of time or, said otherwise, the instantaneous pressure decreases with time. Accordingly, the measurement error of the determined flow rate also decreases with time. Selecting the pressure drop as a representative factor of the measurement error instead of just the amount of time that has passed is due to the following. The pressure drop is a physical quantity of the system that is affected by multiple physical parameters like volume, temperature, or the number of air molecules. The elapsed time is independent of such physical parameters. Therefore, the pressure drop is more representative of the physical characteristics of the system under test as compared to the elapsed time.

The stability indicator is a parameter that quantifies how stable the determined flow rate is. Indeed, the determined flow rate may undergo an instability stage, which may be due to artefacts of the measurement, and then reach a substantially stationary stage. The determined flow rate may be considered stable and, thus, reliable once it has reached the stationary stage. The stability indicator indicates whether the stationary stage has been reached.

Exemplarily, the stability indicator may be the arithmetic mean among a subset of the last l determined flow rates prior to (i.e. excluding) the determined flow rate currently under consideration. Accordingly, the method may further comprise storing each determined flow rate, e.g. in a storage medium.

Since the subset of the last l determined flow rates changes every time a new flow rate is determined, it can also be said that the stability indicator is the moving average $A^l$ of the determined flow rate having a filter length of l, i.e. a moving average over l values:

$$A^l(t_{c-1}) = \frac{\sum_{i=c-l}^{c-1} F(t_i)}{l},$$

wherein $t_c$ is the time point of the determined flow rate currently under consideration and $t_{c-1}$ is the time point of the last determined flow rate before the current one.

The stability range may be an interval centred on the current determined flow rate $F(t_c)$. In other words, the upper limit of the range may be $F(t_c)+R$ and the lower limit of the range may be $F(t_c)-R$, with R being a given percentage of $F(t_c)$, e.g. $R \le 0.004F(t_c)$ for first stop criteria or $R \le 0.015F(t_c)$ for second stop criteria.

In other examples, the stability range may be centred on the moving average including the current determined flow rate, $A^l(t_c)$. More generally, also when performing the comparison with the flow range, the arithmetic mean $A^l(t_c)$ may be used instead of the instantaneous determined flow rate $F(t_c)$. In these cases, the check step may be performed for c−1 times only determining the flow rate and then, from the (c+1)th time, including also the rest of the operations.

Summarising, in one example the stability range is a numerical interval centred on the determined flow rate corresponding to the c-th performed check step and the stability indicator is an average value of a subset of t determined flow rates corresponding to performed check steps (c−l)-th to (c−1)-th. Exemplarily, l may be at least 5, e.g. may be 10.

Exemplarily, for such a stability indicator, the stop criteria can only be considered satisfied if the stability indicator can be computed, i.e. if the check step is performed at least l+1 times. Accordingly, if the stability indicator cannot be determined (e.g. an error message is received because there are not enough data points), the stop criteria may be considered not satisfied, so that the check step has to be repeated.

In the example discussed above, the stability indicator was the moving average of the determined flow rate. Based on the determined flow rate, the stability indicator may also be computed using other statistical and/or mathematical approaches. For example, the variance of the determined flow rate may be computed and the stability range may be provided by stored values for the variance, e.g. obtained from theoretical considerations and/or data saved from previous tests. In other examples, the stability indicator may not be derived from the determined flow rate. For instance, the stability indicator may the temperature measured by a sensor located e.g. within the housing of the filter or proximate to the housing (upstream).

In the above example for the stop criteria, determining whether the stop criteria are satisfied may comprise: determining a stability indicator of the determined flow rate; measuring the instantaneous pressure at the upstream side of the filter to obtain the measured pressure drop as a difference between the test pressure and the instantaneous pressure; and comparing the stability indicator with the stability range and comparing the measured pressure drop with the pressure drop threshold. If the pressure drop has already been measured when determining the flow rate, it need not be measured again.

The stop criteria are not satisfied when the stability indicator is outside the stability range and/or the measured pressure drop is less than the pressure drop threshold. The stop criteria are satisfied when the stability indicator is within the stability range and the measured pressure drop is greater than or equal to the pressure drop threshold.

In the above example the stop criteria are based on the pressure drop and the stability indicator as parameters onto which constraints are imposed. Additional or alternative parameters may be used. For example, the measurement error itself may be determined based on empirical data and/or quantities like elapsed time and pressure drop. It may then be ensured that the check phase is not stopped until the value of the measurement (the determined flow rate) considering the error is strictly less than or greater than the flow threshold. In other words, the check step may be repeated until the flow threshold value is excluded as a possible value for the determined flow rate even within the error bar.

In a particular example, the method may further comprise waiting for a stabilization time after pressurizing the upstream side of the filter before performing the check step, wherein the stabilization time is retrieved from a table based on the test pressure and on a volume of the upstream side of the filter.

In other words, the method may comprise a stabilization phase further to the pressurization phase and the check phase. The stabilization phase may be needed to ensure that the test pressure is maintained for a certain amount of time, in order to counteract temperature variations and their effects and to provide a stable environment for carrying out the check phase. A stable temperature environment enhances the accuracy of the determined flow rate computed on the basis of the formulas described above.

As mentioned above, the volume of the upstream side of the filter is known, e.g. measured in a volume measurement phase that takes place before the pressurization phase or entered manually by a user. The stabilization time (i.e. the duration of the stabilization phase) may be set based on the volume and the test pressure. The relation between these parameters may be expressed in a look-up table so that an appropriate stabilization time may be easily picked, thereby making the process more efficient.

In an alternative example, the duration of the stabilization phase could also be made adaptive by allowing the integrity tester to decide when the phase should end. A temperature sensor may be placed near the filter assembly, e.g. as close to the actual filter membrane as possible. Once a stable temperature has been reached, the stabilization phase can end. The method described heretofore may in particular be a computer-implemented method.

The computer-implemented method may be performed automatically by at least one processor that e.g. controls valves and measuring equipment, performs calculations, stores values, retrieves values and so on.

In some examples, a user input may be required before, while or after performing an action, e.g. for one or more test parameters (e.g. test pressure or flow threshold). The test parameters are quantities that influence the performance of the test (i.e. the test may be performed according to the test parameters) and the result thereof. Any test parameter, and in particular the flow threshold, the flow range, the first stop criteria and the second stop criteria, may be input by a user or may be already pre-programmed. In both cases, the value(s) of the test parameter(s) may be stored in a storage medium and then retrieved when needed.

The principles illustrated above have been discussed with particular reference to the diffusion test and the water flow test as integrity tests. Of course, the same principles can be applied to a multi-point diffusion test, which is a series of diffusion tests carried out sequentially at different test pressures on the same filter. Similarly, they can be applied to the "diffusion part" of the combined diffusion and bubble point test.

For a standalone bubble point test, instead, the automatic stabilization time from the lookup table may be used.

Another aspect of the present invention relates to a computer program product comprising computer readable instructions, which, when executed on a computer system, cause the computer system to perform operations according to what described heretofore.

Yet another aspect of the present invention relates to a system for testing integrity of a filter (also denoted as "integrity tester"). The system comprises: at least one processor; a memory; and a communication channel configured to be connected to the filter. The at least one processor is configured to:

pressurize an upstream side of the filter to a test pressure;
    perform a check step comprising:
        determining a flow rate of fluid from the upstream side to a downstream side of the filter;
        comparing the determined flow rate with a flow range including a flow threshold;

setting stop criteria based on the comparison, wherein the stop criteria comprise at least one quantitative constraint indicative of a reliability of the determined flow rate and wherein:

if the determined flow rate is within the flow range, the stop criteria are set to first stop criteria; and if the determined flow rate is outside the flow range, the stop criteria are set to second stop criteria;

determining whether the stop criteria are satisfied;

if the stop criteria are not satisfied, repeat the check step until the stop criteria are satisfied;

if the stop criteria are satisfied, compare the determined flow rate with the flow threshold:

if the determined flow rate is greater than or equal to the flow threshold, determine that the filter is non-integral; and if the determined flow rate is less than the flow threshold, determine that the filter is integral.

The communication channel may be e.g. a gas inlet line connected to the upstream side or inlet side of the filter, and may exemplarily be a tube. The system may further comprise an output unit (such as a display), an input unit (such as a keyboard or a touchscreen) and one or more additional connectors and/or ports.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

FIG. 4 shows an exemplary table with stabilization time values as a function of test pressure and upstream volume.

FIG. 9 shows an exemplary table with pressure drop threshold values as a function of upstream volume.

FIG. 11 shows a flowchart of a method for testing the integrity of a filter.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
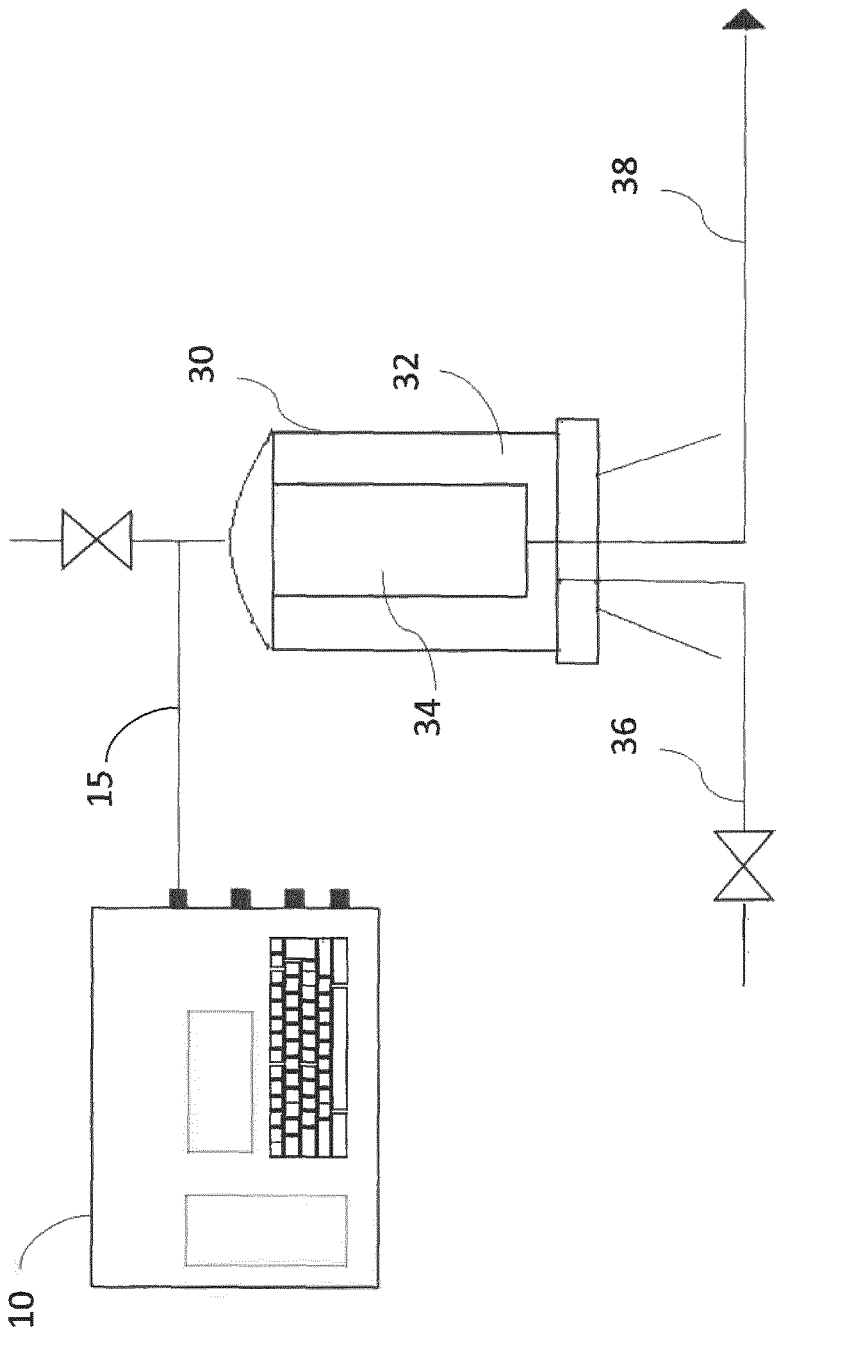
FIG. 1 shows a schematic representation of an integrity tester connected to a filter.

FIG. 1 shows a schematic representation of an integrity tester 10 connected to a filter 30 by means of a tube 15. The integrity tester 10 is a system comprising at least one processor and a memory (not shown), two output units (a printer and a display) and an input unit (a keyboard and/or a barcode scanner). Alternatively, the integrity tester 10 may comprise a touch screen acting both as output and input unit.

The filter (or filter assembly) 30 comprises a housing 32 and a membrane 34. The filter 30 is connected via an upstream pipe 36 to a draining setup and via a downstream pipe 38 to the downstream filtrate side.

The function of the communication channel, the tube 15, between the integrity tester 10 and the filter 30 is to provide gas to the filter 30 during the pressurization phase.

The setup may additionally have more external valves or sensors connected to the filter under test 30. These external valves could be utilized for additional safety and protect against backflow. The external sensors can be utilized to supplement or replace the internal sensors of the integrity tester 10.

Figure 2:
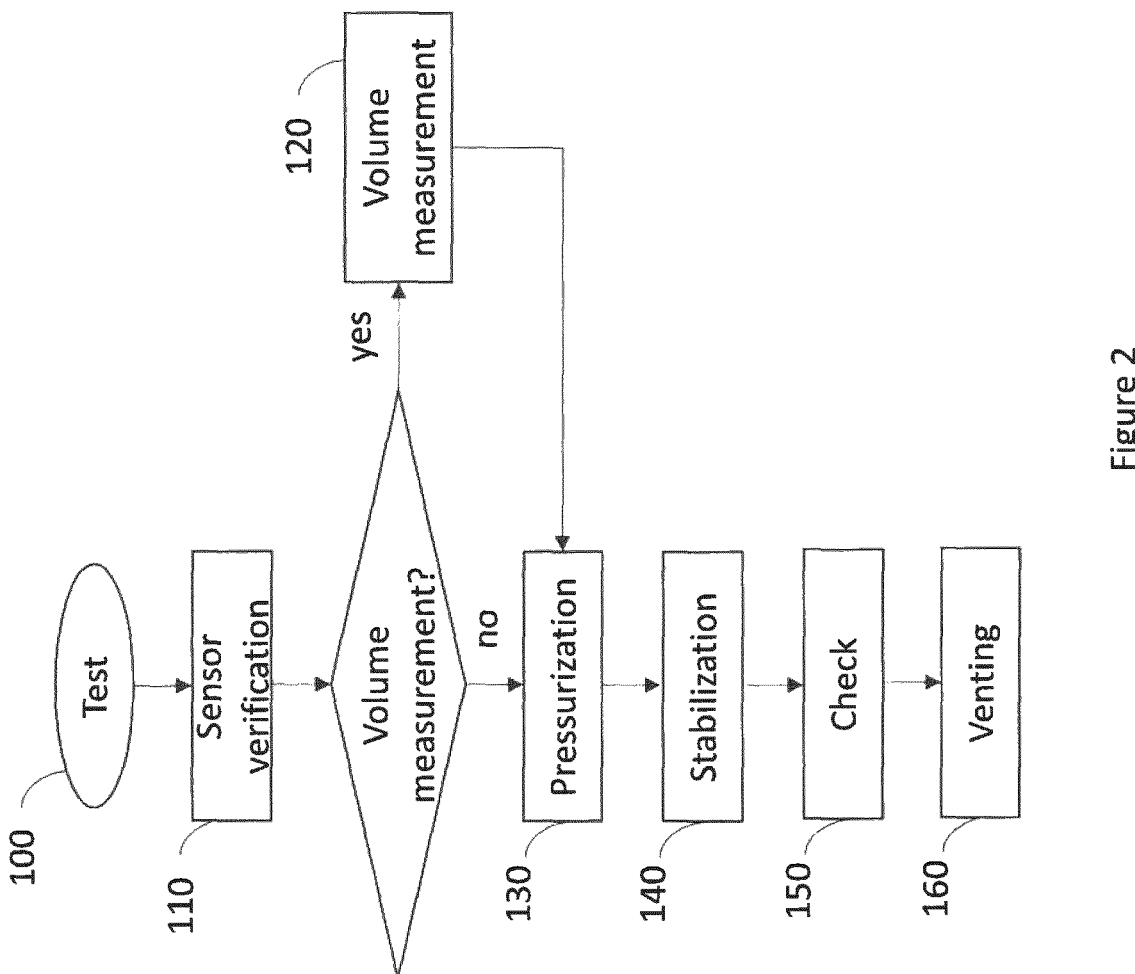
FIG. 2 shows a flow chart of an exemplary integrity test.

FIG. 2 shows a flow chart of an exemplary integrity test 100 carried out by the integrity tester 10. Prior to the test 100, a preparation of the filter may be carried out, e.g. hydrophilic filter may be wetted with wetting liquid while a hydrophobic filter may blinded with water.

During the (optional) sensor verification 110 the tester 10 makes sure that the internal sensors are calibrated and operating properly. Then, in response to a user input, it is set whether to perform a volume measurement 120 of the upstream volume of the filter 30. The volume measurement 120 may be performed e.g. using Boyle's law. If no volume measurement is made, the value of the volume may be input by the user.

Directly after the sensor verification 110 or after the volume measurement 120 the pressurization 130 takes place. In the pressurization phase the pressure at the upstream side of the filter 30 is brought to a test pressure, whose value may be input by a user or may be pre-programmed in the integrity tester 10 (e.g. for a specific filter model).

After pressurizing the upstream volume to the test pressure, the tester 10 ensures that the pressure is maintained for a certain amount of time. This is the phase of stabilization 140 and its duration (or stabilization time) is set based on the test pressure and the upstream volume. The table of FIG. 4 shows exemplary stabilization time values associated to different ranges of test pressure and upstream volume. Accordingly, a suitable stabilization time is automatically set using a look-up table like the one in FIG. 4.

Following the stabilization 140, the test 100 comprises the check 150, during which the actual integrity checking takes place. The check 150 will be described in more detail below with reference to FIG. 5. At the end of the test 100, the filter is vented at 160.

Figure 3:
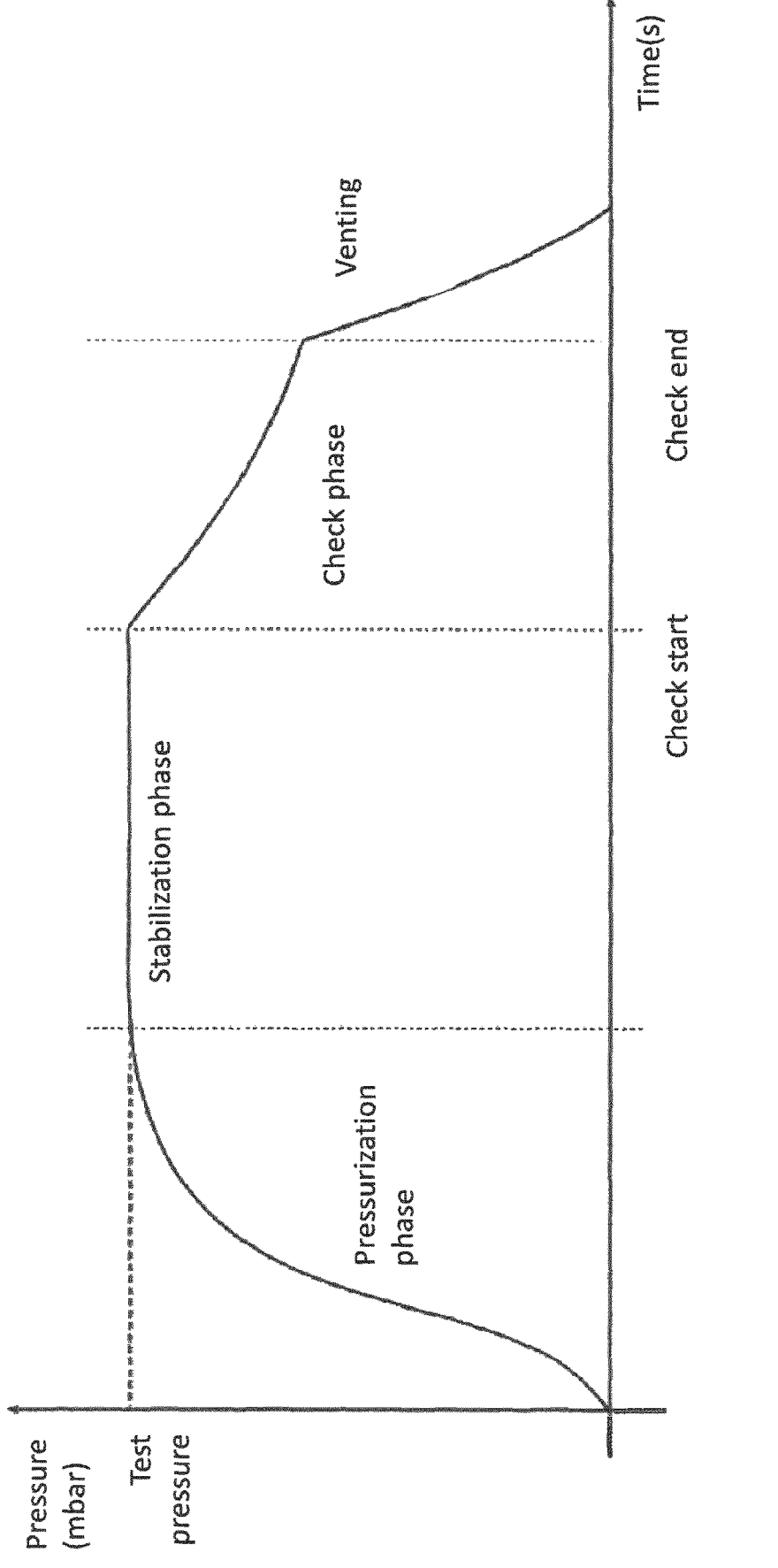
FIG. 3 shows a plot of pressure versus time over the different phases of the integrity test.

FIG. 3 shows a plot of pressure versus time over the different phases of the integrity test 100. It can be seen that the pressure increases to finally reach the test pressure during the pressurization phase, then stays at the test pressure during the stabilization phase, starts decreasing during the check phase and finally drops to zero after venting.

Figure 5:
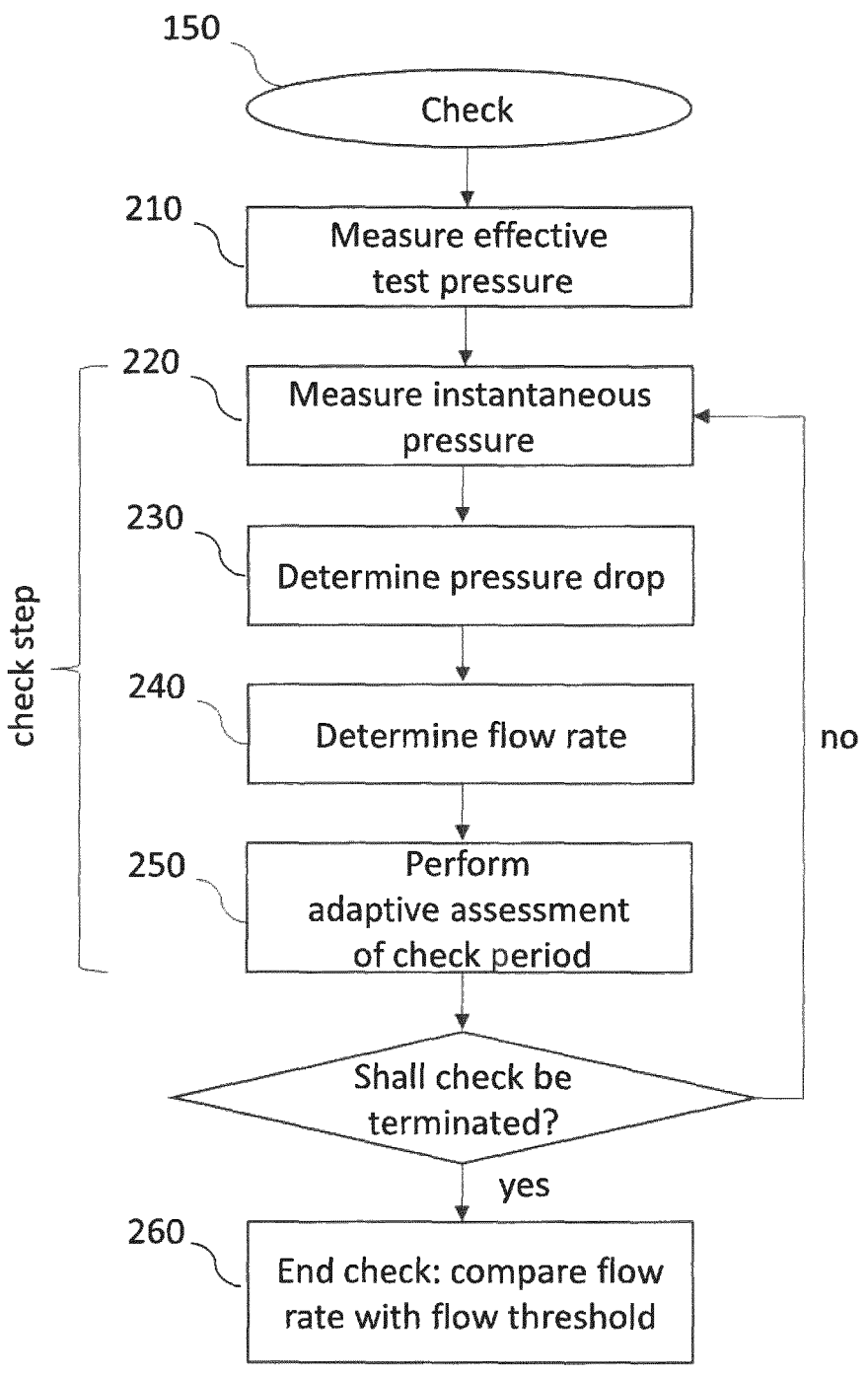
FIG. 5 shows a flow chart of an exemplary check phase of the integrity test.

FIG. 5 shows a flow chart of an exemplary check phase of the integrity test. The check phase 150 of the integrity test 100 comprises determining 240 a flow rate of fluid from the upstream side to the downstream side of the filter 30. The flow rate is determined as proxy for the actual retention capability of the filter.

In order to determine the flow rate, a measurement of the pressure drop at the upstream side of the filter may exemplarily be needed. Accordingly, the check phase may optionally comprise first measuring 210 the effective test pressure, i.e. measuring the starting pressure at the beginning of the check phase, which may be slightly different from the nominal test pressure. The measurement of the effective test pressure at 210 is performed only once at the beginning of the check phase 150 and not as part of the check step, which may be repeated multiple times.

Then at 220 the check step begins and the instantaneous pressure at the upstream side of the filter is measured in order to obtain, at 230, the pressure drop. Using the pressure drop, the flow rate can be determined at 240, e.g., for a diffusion test, as a diffusionary flow rate that depends logarithmically on the pressure drop. Alternatively, for a water flow test, the bulk/volumetric flow rate depends linearly on the pressure drop.

As mentioned, the determined flow rate is the quantity used to assess the integrity of the filter and, thus, it is important that the determined flow rate is accurate. Conventionally, the flow rate is determined at each of a succession of time points and after a fixed, relatively long time it is assumed that the determined flow rate is sufficiently accurate for the purpose of integrity assessment. In other words, the last data point in a time series of determined flow rates is considered reliable.

While waiting for a sufficiently long amount of time ensures that the determined flow rate is sufficiently accurate, the temporal efficiency of the test 100 is negatively affected by this. According to the invention, instead, the duration of the check phase is adaptively determined at 250. This adaptive assessment will be described in detail with reference to FIG. 6 below.

The adaptive assessment determines whether the determined flow rate corresponding to a given time point is sufficiently reliable for the test aim. If not, the check phase continues by repeating the check step and the flow rate is determined anew at a subsequent time point; if so, the check phase is terminated and the (last) determined flow rate is compared with a flow threshold.

The flow threshold is a test parameter whose value may be input by a user or may be pre-programmed in the integrity tester 10 (e.g. for a specific filter model). If the determined flow rate is greater than or equal to the flow threshold, the filter 30 does not pass the test 100, meaning that its integrity has been compromised. If the determined flow rate is less than the flow threshold, the filter 30 passes the test 100, meaning that its integrity is confirmed.

Figure 6:
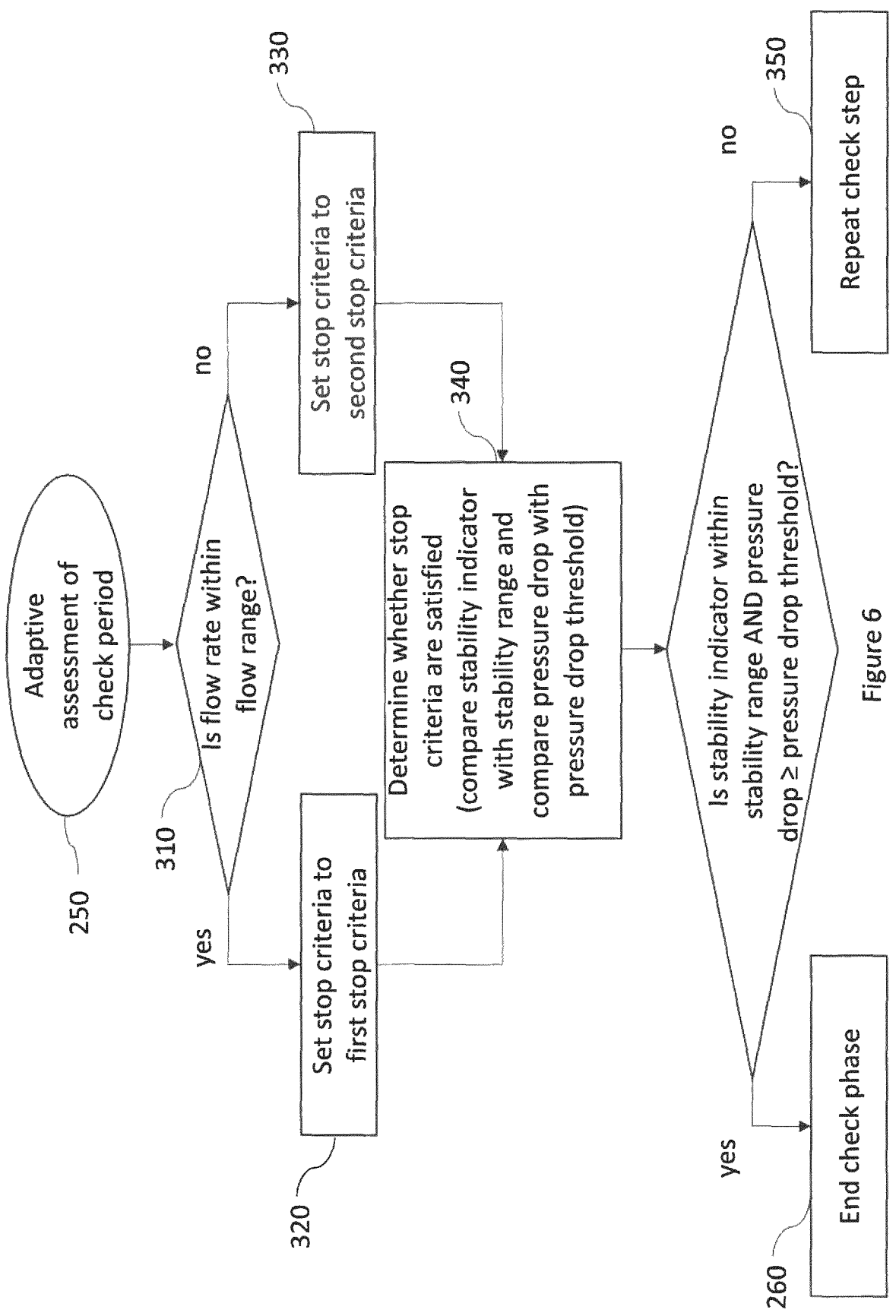
FIG. 6 shows a flow chart of an exemplary adaptive assessment of the duration of the check phase.

FIG. 6 shows a flow chart of an exemplary adaptive assessment 250 of the duration of the check phase. The decision on whether to terminate the check phase is made dependent on stop criteria, which, in turn, depend on how close the determined flow rate $F(t_c)$ is to the critical value of the flow threshold.

Figure 7:
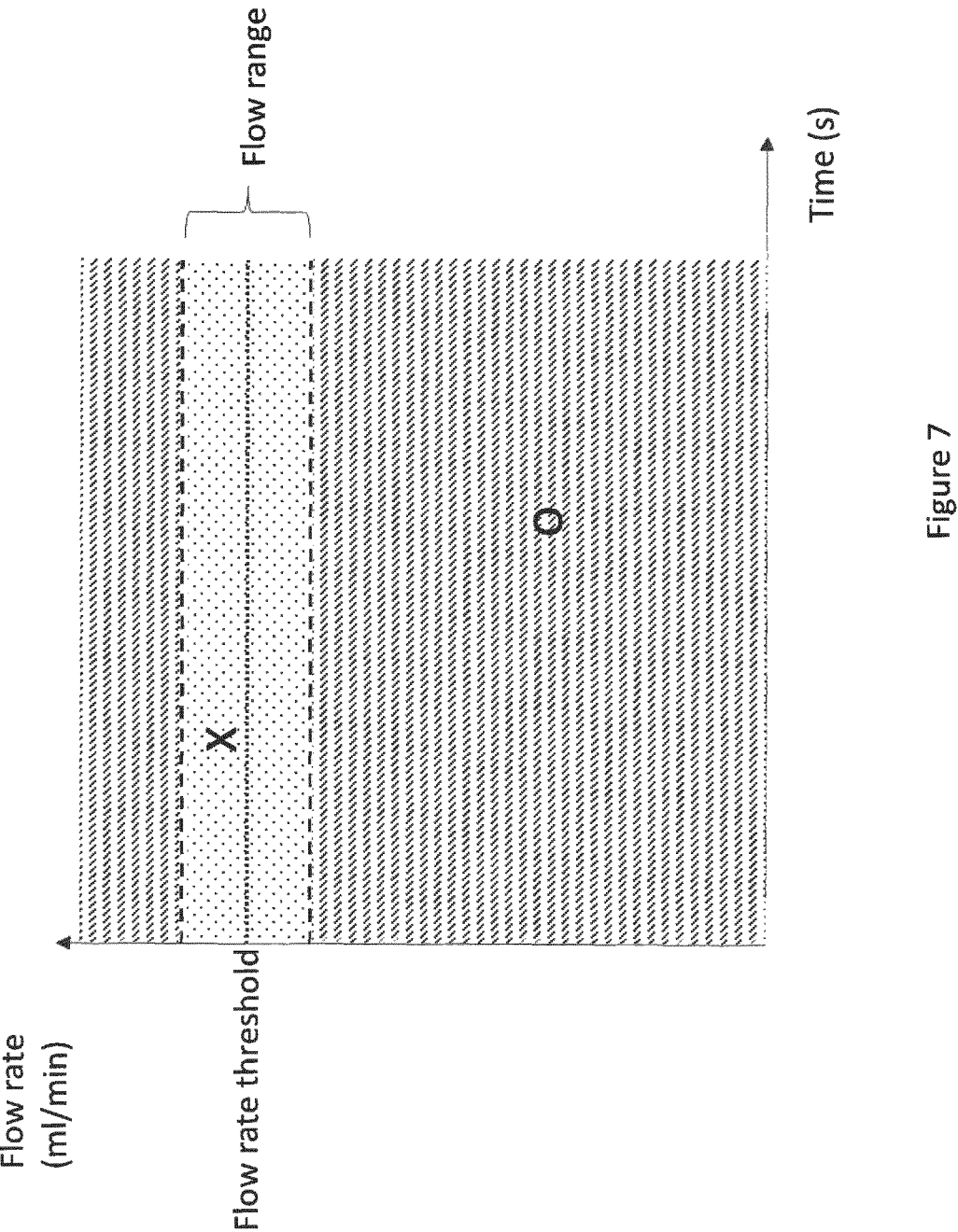
FIG. 7 shows a representation of the flow threshold and the flow range.

A flow range can be defined around the flow threshold as the numerical range between $(1-x)F_{th}$ and $(1+x)F_{th}$, with x<1. For example, x<0.15, such as x=0.08. In other words, the flow range is exemplarily the interval $\mp8\%$ around the flow threshold. FIG. 7 shows a representation of the flow threshold and the flow range.

The determined flow rate is compared with the flow range at 310. If the determined flow rate is within the flow range (see cross in FIG. 7), the stop criteria are set to be strict criteria or first stop criteria at 320. If the determined flow rate is outside the flow range (see circle in FIG. 7), the stop criteria are set to be lenient criteria or second stop criteria at 330.

Figure 8:
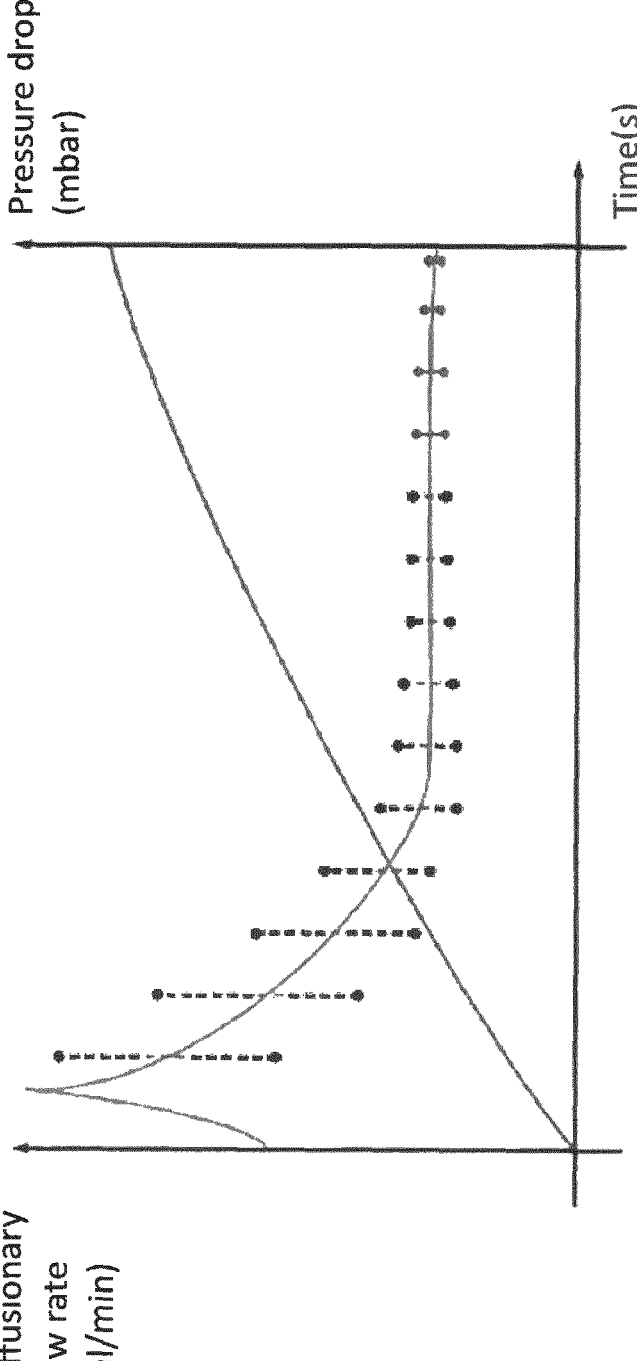
FIG. 8 shows a plot of pressure drop and diffusionary (or "diffusion-based") flow rate versus time during the check phase.

Then, at 340, it is checked whether the stop criteria are satisfied. The stop criteria include a constraint on the value of the pressure drop at the time at which the flow rate was determined. The reason is that the pressure drop is correlated with the error on the determined flow rate, as shown in the plot of FIG. 8: the higher the pressure drop, the lower the error bar. It should be noted that FIG. 8 shows a diffusionary flow rate as a particular example of flow rate.

Thus, in order to ensure that the determined flow rate is sufficiently reliable, the constraint is that the pressure drop has to be at least equal to a pressure drop threshold. The pressure drop threshold is a test parameter whose value may be input by a user or may be pre-programmed in the integrity tester 10 (e.g. for a specific filter model). The pressure drop threshold may vary based on the upstream volume.

FIG. 9 shows an exemplary table with strict pressure drop threshold values as a function of upstream volume. For example, for a volume of 5 L, if first stop criteria have been selected, the pressure drop has to be at least 40 mbar. For second stop criteria, the pressure drop threshold for 5 L may be e.g. 15 mbar.

Accordingly, at 340 the measured pressure drop is compared with the pressure drop threshold. Further, another check is made to verify whether the stop criteria are met, namely using a stability indicator. Indeed, the stop criteria comprise a further constraint on this stability indicator.

The stability indicator is obtained by computing the average (arithmetic mean) over a subset of the determined flow rate values preceding the value under consideration, $F(t_c)$. In particular, the 10 values before $F(t_c)$ are averaged, i.e. $F(t_{c-10}) \ldots F(t_{c-1})$. The constraint is that this average, $A^{10}(t_{c-1})$, has to be within an interval around $F(t_c)$, the stability range.

Figure 10:
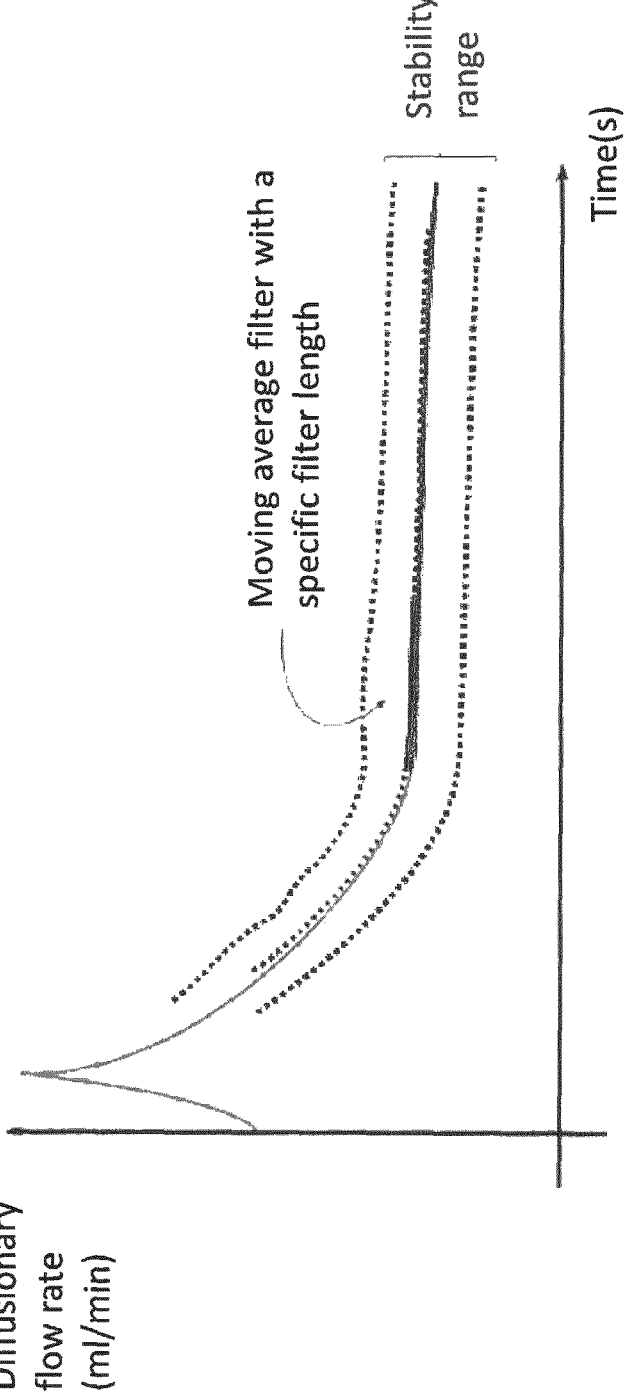
FIG. 10 shows a plot of a stability range versus time during the check phase.

Exemplarily, for first stop criteria, $0.998F(t_c) \leq A^{10}(t_{c-1}) \leq 1.002F(t_c)$ and, for second stop criteria, $0.989F(t_c) \leq A^{10}(t_{c-1}) \leq 1.011F(t_c)$. The stability range is a test parameter whose values may be input by a user or may be pre-programmed in the integrity tester 10 (e.g. for a specific filter model). FIG. 10 shows a plot of a stability range versus time during the check phase for a diffusionary flow rate.

Accordingly, at 340 the measured pressure drop is compared with the pressure drop threshold and the stability indicator is compared with the stability range. If both constraints of the stop criteria are satisfied, i.e. the pressure drop is equal to or higher than the pressure drop threshold and the stability indicator is within the stability range, it is determined that the check phase can be ended at 260. As discussed above, in this case, the determined flow rate is compared with the flow threshold.

If one or both constraints is/are not satisfied, it is determined that the check phase should be continued and the check step should be repeated at 350. Accordingly, a new flow rate is determined and then it is again evaluated whether the new determined flow rate is reliable enough to be compared with the flow threshold and, thus, provide the test result. The check step is repeated until the stop criteria are met.

Therefore, the duration of the check phase is adaptively determined, thereby making the check phase as fast as possible while maintaining a desired accuracy. FIG. 11 shows a flowchart of a method 400 for testing the integrity of a filter, including steps 402, 404, 406, 408, 410, and 412.

The invention claimed is:

1. A method for testing integrity of a filter, the method comprising:
   pressurizing an upstream side of the filter to a test pressure; and
   performing a check step comprising:
   determining a flow rate of fluid from the upstream side to a downstream side of the filter;

comparing the determined flow rate with a flow range including a flow threshold;

setting stop criteria based on the comparison, wherein the stop criteria comprise at least one quantitative constraint indicative of a reliability of the determined flow rate and wherein:

if the determined flow rate is within the flow range, the stop criteria are set to first stop criteria; and if the determined flow rate is outside the flow range, the stop criteria are set to second stop criteria;

determining whether the stop criteria are satisfied;

if the stop criteria are not satisfied, repeating the check step until the stop criteria are satisfied;

if the stop criteria are satisfied, comparing the determined flow rate with the flow threshold;

if the determined flow rate is greater than or equal to the flow threshold, determining that the filter is non-integral; and if the determined flow rate is less than the flow threshold, determining that the filter is integral, wherein the stop criteria comprise a stability range and a pressure drop threshold, and determining whether the stop criteria are satisfied comprises:

determining a stability indicator of the determined flow rate, the stability indicator being a parameter that quantifies the stability of the determined flow rate;

measuring an instantaneous pressure at the upstream side of the filter to obtain a measured pressure drop as a difference between the test pressure and the instantaneous pressure;

comparing the stability indicator with the stability range and comparing the measured pressure drop with the pressure drop threshold; and determining that the stop criteria are not satisfied when the stability indicator is outside the stability range and the measured pressure drop is greater than or equal to the pressure drop threshold.

2. The method of claim 1, wherein the stability range is a numerical interval centered on the determined flow rate corresponding to the c-th performed check step and the stability indicator is an average value of a subset of l determined flow rates corresponding to performed check steps (c–l)-th to (c–1)-th.

3. The method of claim 1, wherein the test fluid is a gas and the flow rate is a diffusional flow rate.

4. The method of claim 1, wherein the test fluid is water and the flow rate is a bulk flow rate.

5. The method of claim 1, further comprising waiting for stabilization time after pressurizing the upstream side of the filter before performing the check step, wherein:

the stabilization time is retrieved from a table based on the test pressure and on a volume of the upstream side of the filter.

6. The method of claim 1, wherein the flow range is a first flow range and the stop criteria are set to the second stop criteria if, further, the determined flow rate is within a second flow range, the first flow range being included in the second flow range; and the method further comprises setting the stop criteria to third stop criteria if the determined flow rate is outside the second flow range.

7. A computer program product comprising computer readable instructions, which, when executed on a computer system, cause the computer system to perform operations according to claim 1.

8. A system for testing integrity of a filter, the system comprising:

at least one processor;

a memory;

a communication channel configured to be connected to the filter;

wherein the at least one processor is configured to:

pressurize an upstream side of the filter to a test pressure; and perform a check step comprising:

determining a flow rate of fluid from the upstream side to a downstream side of the filter;

comparing the determined flow rate with a flow range including a flow threshold;

setting stop criteria based on the comparison, wherein the stop criteria comprise at least one quantitative constraint indicative of a reliability of the determined flow rate and wherein if the determined flow rate is within the flow range, the stop criteria are set to first stop criteria, and if the determined flow rate is outside the flow range, the stop criteria are set to second stop criteria;

determining whether the stop criteria are satisfied;

if the stop criteria are not satisfied, repeat the check step until the stop criteria are satisfied;

if the stop criteria are satisfied, compare the determined flow rate with the flow threshold;

if the determined flow rate is greater than or equal to the flow threshold, determine that the filter is non-integral; and if the determined flow rate is less than the flow threshold, determine that the filter is integral, wherein the stop criteria comprise a stability range and a pressure drop threshold, and the at least one processor is further configured to:

determine a stability indicator of the determined flow rate, the stability indicator being a parameter that quantifies how stable the determined flow rate is;

measure an instantaneous pressure at the upstream side of the filter to obtain a measured pressure drop as a difference between the test pressure and the instantaneous pressure;

compare the stability indicator with the stability range and comparing the measured pressure drop with the pressure drop threshold; and determine the stop criteria are not satisfied when the stability indicator is outside the stability range and/or the measured pressure drop is less than the pressure drop threshold; and determine the stop criteria are satisfied when the stability indicator is within the stability range and the measured pressure drop is greater than or equal to the pressure drop threshold.

9. The system of claim 8, wherein the stability range is a numerical interval centered on the determined flow rate corresponding to the c-th performed check step and the stability indicator is an average value of a subset of l determined flow rates corresponding to performed check steps (c–l)-th to (c–1)-th.

10. The system of claim 8, wherein the test fluid is a gas and the flow rate is a diffusional flow rate.

11. The system of claim 8, wherein the test fluid is water and the flow rate is a bulk flow rate.

12. The system of claim 8, wherein the at least one processor is further configured to:

retrieve a stabilization time from a table based on the test pressure and on a volume of the upstream side of the filter; and wait for a stabilization time after pressurization of the upstream side of the filter before execution of the check step.

13. The system of claim 8, wherein the flow range is a first flow range and the stop criteria are set to the second stop criteria if, further, the determined flow rate is within a second flow range, the first flow range being included in the second flow range; and the least one processor is further configured to set the stop criteria to third stop criteria if the determined flow rate is outside the second flow range.

\*   \*   \*   \*   \*